(12) United States Patent
Endo

(10) Patent No.: US 11,912,280 B2
(45) Date of Patent: Feb. 27, 2024

(54) DRIVING DIAGNOSIS DEVICE AND DRIVING DIAGNOSIS METHOD

(71) Applicant: TOYOTA JIDOSHA KABUSHIKI KAISHA, Toyota (JP)

(72) Inventor: Masato Endo, Nagoya Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 17/568,994

(22) Filed: Jan. 5, 2022

(65) Prior Publication Data
US 2022/0289197 A1 Sep. 15, 2022

(30) Foreign Application Priority Data

Mar. 10, 2021 (JP) .................................. 2021-038780

(51) Int. Cl.
*B60W 30/18* (2012.01)
*A63F 13/25* (2014.01)
*B62D 15/02* (2006.01)
*G07C 5/08* (2006.01)

(52) U.S. Cl.
CPC ....... *B60W 30/18109* (2013.01); *A63F 13/25* (2014.09); *B62D 15/021* (2013.01); *G07C 5/0808* (2013.01)

(58) Field of Classification Search
CPC ......... G07C 5/04; A63F 13/803; A63F 13/537
See application file for complete search history.

(56) References Cited

U.S. PATENT DOCUMENTS

| 2014/0007733 | A1 | 1/2014 | Tanaka et al. | |
| 2020/0184500 | A1 | 6/2020 | Yuyama et al. | |
| 2021/0157569 | A1* | 5/2021 | Harata | B60K 37/02 |
| 2021/0157573 | A1* | 5/2021 | Abe | G06F 3/14 |
| 2021/0255805 | A1* | 8/2021 | Harata | H04L 12/403 |
| 2022/0291888 | A1* | 9/2022 | Kamezaki | B60K 37/06 |
| 2022/0292886 | A1* | 9/2022 | Endo | B60K 35/00 |
| 2022/0406105 | A1* | 12/2022 | Sugiura | G07C 5/0841 |
| 2023/0026609 | A1* | 1/2023 | Endo | G07C 5/0808 |

FOREIGN PATENT DOCUMENTS

| JP | H10329580 A | 12/1998 |
| JP | 2014-015130 A | 1/2014 |
| JP | 2019-012481 A | 1/2019 |
| JP | 2020-095403 A | 6/2020 |

* cited by examiner

*Primary Examiner* — John Kwon
(74) *Attorney, Agent, or Firm* — Dinsmore & Shohl LLP

(57) ABSTRACT

A driving diagnosis device includes: an event display unit that displays at least one event that is executed while a vehicle is driven; an event determination unit that determines whether the event is executed; a change element giving unit that gives, to a character of a game that is displayed on a display unit of an operation terminal by executing a game application, a change element generated in response to the event determined to be executed by the event determination unit; and a determination prohibition unit that causes the event determination unit not to determine that the same event is executed, when the same event is executed after the number of times the same event is executed exceeds a limited number of times that is a predetermined plurality of times.

6 Claims, 14 Drawing Sheets

FIG. 9
| LOCK TYPE | LOCK POINT |
|---|---|
| SINGLE LOCK STATE | 1 |
| FIRST LINKAGE LOCK STATE | 2 |
| SECOND LINKAGE LOCK STATE | 3 |
FIG. 10
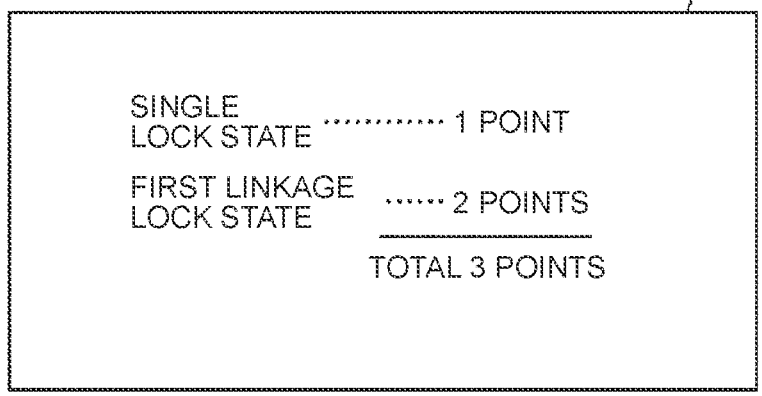
FIG. 11
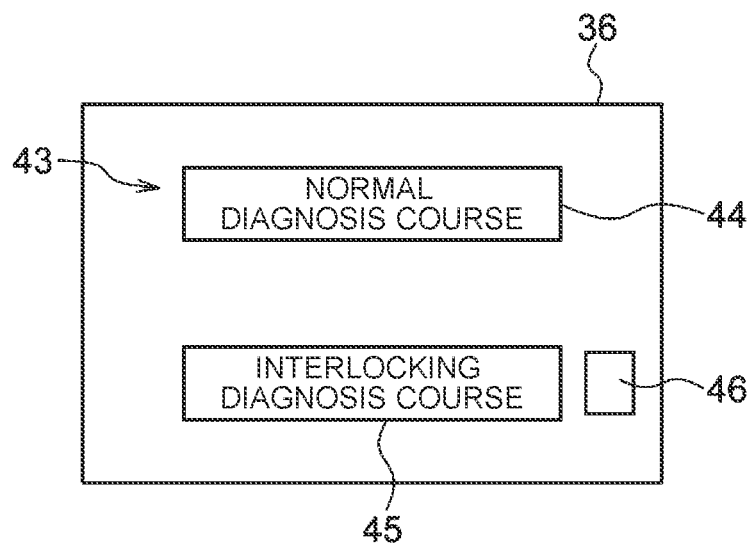

| ITEM | CHANGE ELEMENT |
|---|---|
| ATTACK POINT | INCREASES BY XX POINTS (ACCELERATOR XX POINTS) |
| DEFENSE POINT | INCREASES BY ZX POINTS (BRAKE ZY POINTS) |
| HIT POINT | INCREASES BY YY POINTS (STEERING YZ POINTS) |
| MONEY | GET XX (BONUS ACTION 1) |
| WEAPON | GET ZZ (BONUS ACTION 2) |
| MAGIC | MASTERS MAGIC OF YZ (EVENT 1) |
| MAGIC | MASTERS MAGIC OF ZZ (SPECIAL EVENT 2) |

| TOTAL VALUE OF LOCK POINTS | COEFFICIENT |
|---|---|
| 0 | 0 |
| 1 | 1 |
| 2 | 1.5 |
| 3 | 2 |
| 4 | 2.5 |

DRIVING DIAGNOSIS DEVICE AND DRIVING DIAGNOSIS METHOD

CROSS-REFERENCE TO RELATED APPLICATION

This application claims priority to Japanese Patent Application No. 2021-038780 filed on Mar. 10, 2021, incorporated herein by reference in its entirety.

BACKGROUND

1. Technical Field

The present disclosure relates to a driving diagnosis device and a driving diagnosis method.

2. Description of Related Art

The following Japanese Unexamined Patent Application Publication No. 10-329580 (JP 10-329580 A) discloses a driving diagnosis device in which a character displayed on a display unit is trained when a driver safely drives a vehicle.

SUMMARY

The driving diagnosis device of JP 10-329580 A has room for improvement regarding encouraging the driver to perform a driving operation such that various driving diagnosis items are diagnosed.

In consideration of the above facts, an object of the present disclosure is to acquire a driving diagnosis device and a driving diagnosis method that are able to encourage a driver to perform a driving operation in which various driving diagnosis items are diagnosed.

A driving diagnosis device according a first aspect of the disclosure includes: an event display unit that displays at least one event that is executed while a vehicle is driven; an event determination unit that determines whether the event is executed; a change element giving unit that gives, to a character of a game displayed on a display unit of an operation terminal by executing a game application, a change element that is generated in response to the event that is determined by the event determination unit to have been executed; a determination prohibition unit that causes the event determination unit not to determine that the same event is executed, when the same event is executed after the number of times the same event is executed exceeds a limited number of times that is a predetermined plurality of times.

The change element giving unit of the driving diagnosis device according to the above aspect gives the change element generated in response to the event determined to be executed by the event determination unit, to the game character that is displayed on a display unit of the operation terminal when the game application is executed. The determination prohibition unit causes the event determination unit not to determine that the same event is executed, when the same event is executed after the number of times the same event is executed exceeds the limited number of times that is the predetermined plurality of times. Thus, the driver is likely to execute an event different from the same event. Thus, it is possible to encourage the driver to perform a driving operation in which many driving diagnosis items are diagnosed.

In the driving diagnosis device of the above aspect, when a predetermined time has elapsed since the same event is executed for the limited number of times or more, the determination prohibition unit may allow the event determination unit to determine that the same event is executed when the same event is executed.

According to the above aspect, when the predetermined time has elapsed since the same event is executed for the limited number of times or more, the determination prohibition unit allows the event determination unit to determine that the same event is executed when the same event is executed. When the predetermined time has passed, it is significant that the same event (driving diagnosis) is executed. In such a case, the driver can execute the same event.

In the driving diagnosis device of the above aspect, when a predetermined billing process is performed after the same event is executed for the limited number of times or more, the determination prohibition unit may allow the event determination unit to determine that the same event is executed when the same event is executed.

According to the above aspect, when the predetermined billing process is performed after the same event is executed for the limited number of times or more, the determination prohibition unit allows the event determination unit to determine that the same event is executed when the same event is executed. The driver may strongly desire that the same event (driving diagnosis) be performed. In such a case, the driver can execute the same event.

The driving diagnosis device of the above aspect may include an event identification unit that identifies the event that is able to be executed by the vehicle, based on a detected value that is a physical quantity that changes based on at least one of traveling, steering, and braking of the vehicle or a physical quantity that changes when a predetermined operating member is operated, in which the detected value is detected by a detection unit provided in the vehicle, in which the event display unit displays only the event identified by the event identification unit.

According to the above aspect, the event display unit displays only the events that the event identification unit has determined to be executable by the vehicle. Thus, the driver can easily recognize the executable event by looking at the event display unit.

In the driving diagnosis device of the above aspect, the event determination unit may be able to recognize a determination accuracy of whether the event is executed for each of the events, and when the event determination unit determines that a second event that is a predetermined event having a higher determination accuracy than a first event that is a predetermined event is executed, the change element giving unit may give the character the change element that is larger than when the first event is executed.

According to the above aspect, the event determination unit is able to recognize a determination accuracy of whether the event is executed for each of the events, and when the event determination unit determines that the second event having the higher determination accuracy than the first event, the change element giving unit gives the character the change element that is larger than when the first event is executed. Thus, it is possible to encourage the driver to execute an event with a higher determination accuracy.

The driving diagnosis method according to a second aspect of the disclosure includes: a step of displaying at least one event that is executed while a vehicle is driven; a step of determining whether the event is executed; a step of giving a change element that is generated in response to the event determined to have been executed to a character of a game that is displayed on a display unit of an operation terminal when a game application is executed; and step of not to determining that the same event is executed from being performed, when the same event is executed after the number of times the same event is executed exceeds a limited number of times that is a predetermined plurality of times.

As described above, the driving diagnosis device and a driving diagnosis method according to the present disclosure has an effect in which it is possible to encourage a driver to perform a driving operation in which various driving diagnosis items are diagnosed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a diagram showing types of locks and the total number of points;

FIG. 10 is a diagram showing the display unit displaying a lock state and the total number of points;

FIG. 11 is a diagram showing the display unit displaying a course selection screen;

DETAILED DESCRIPTION OF EMBODIMENTS

Hereinafter, embodiments of a driving diagnosis device 10 and a driving diagnosis method according to the present disclosure will be described with reference to the drawings.

Figure 1:
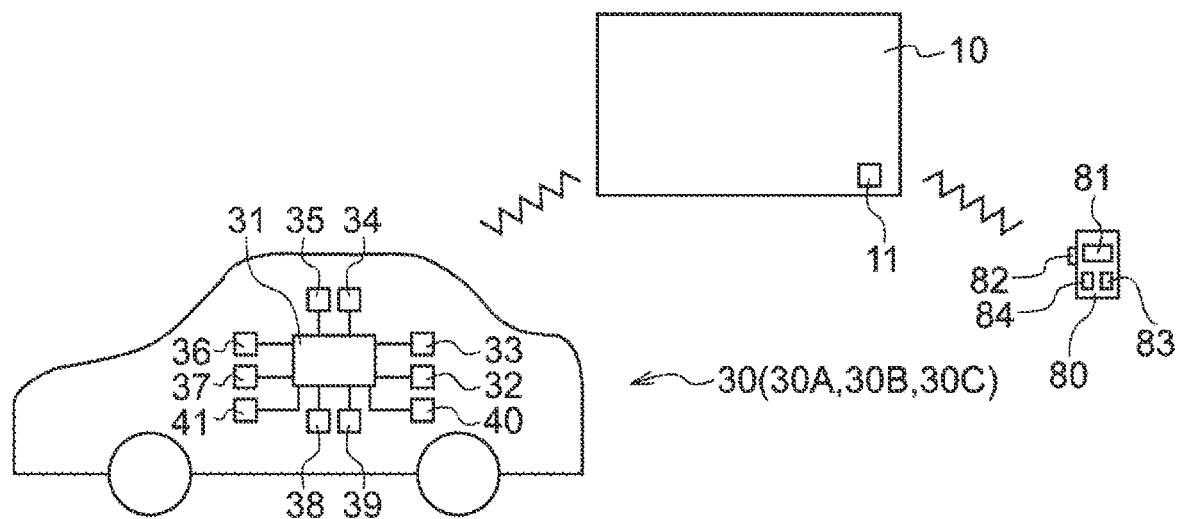
FIG. 1 is a diagram showing a driving diagnosis device, a vehicle, and a mobile terminal according to an embodiment.

As shown in FIG. 1, a vehicle 30 capable of data communication with a transmission-reception unit (diagnosis result acquisition unit) 11 of a driving diagnosis device 10 via a network includes an electronic control unit (ECU) 31, a wheel speed sensor 32 (detection unit), an accelerator operation amount sensor (detection unit) 33, a steering angle sensor (detection unit) 34, an IG switch 35, a display unit (event display unit) 36, a global positioning system (GPS) receiver (detection unit) 37, a first wireless communication device 38, a second wireless communication device 39, a shift lever position sensor (detection unit) 40, a brake pedal force sensor (detection unit) 41, and another detection unit (not shown).

A vehicle ID is attached to the vehicle 30 capable of receiving a diagnosis by the driving diagnosis device 10. There are three types of the vehicle 30 of the present embodiment. That is, there is a type 1 vehicle 30A, a type 2 vehicle 30B, and a type 3 vehicle 30C. In the following description, when it is not necessary to distinguish between the vehicle 30A, the vehicle 30B, and the vehicle 30C, these vehicles are collectively referred to as the vehicle 30. The vehicle 30B has a first linkage lock function that will be described later. The vehicle 30C has a second linkage lock function that will be described later. The vehicle 30A does not have the first linkage lock function nor the second linkage lock function. The wheel speed sensor 32, the accelerator operation amount sensor 33, the steering angle sensor 34, the IG switch 35, the display unit 36, the GPS receiver 37, the first wireless communication device 38, the second wireless communication device 39, the shift lever position sensor 40, the brake pedal force sensor 41, and the above-described other detection unit of the vehicle 30 are connected to the ECU 31. The ECU 31 includes a central processing unit (CPU), a read-only memory (ROM), a random access memory (RAM), a storage, a wireless communication interface (I/F), and an input-output I/F. The above network includes a communication network of a telecommunications carrier and the Internet network.

Figure 2:
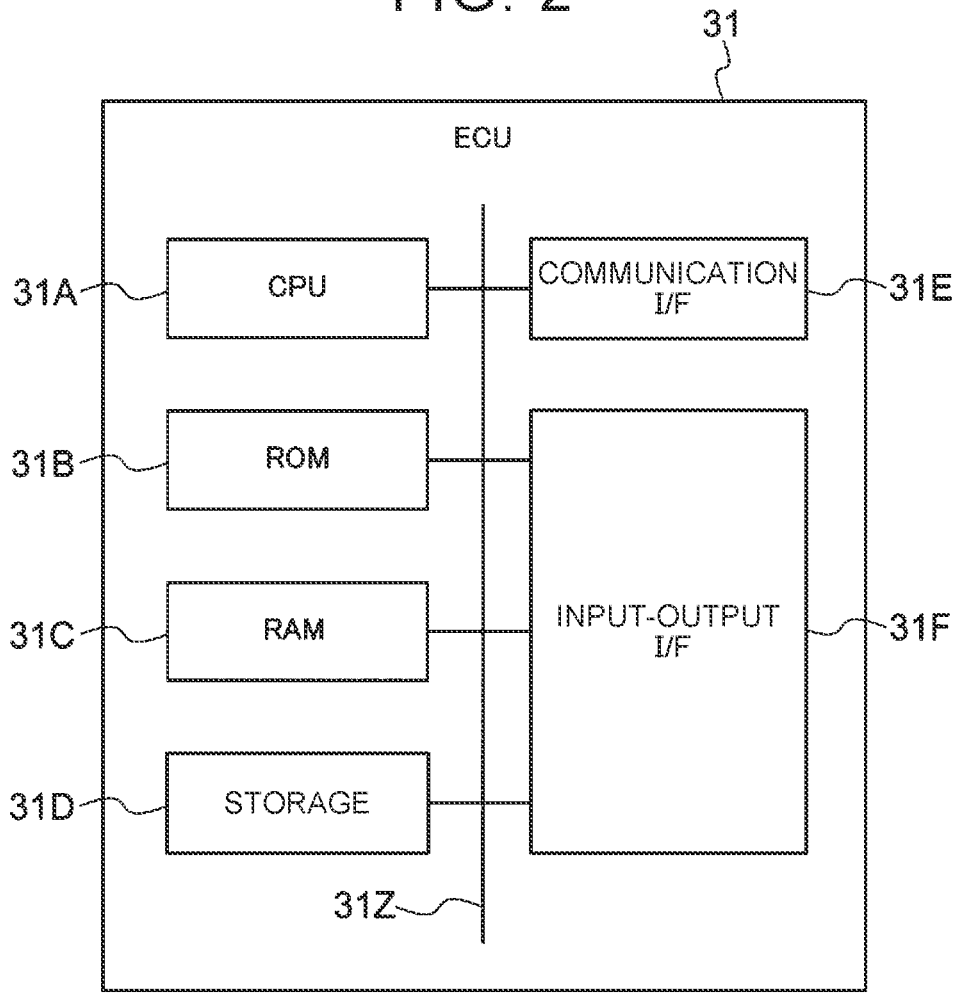
FIG. 2 is a control block diagram of an ECU of the vehicle shown in FIG. 1.
Figure 8:
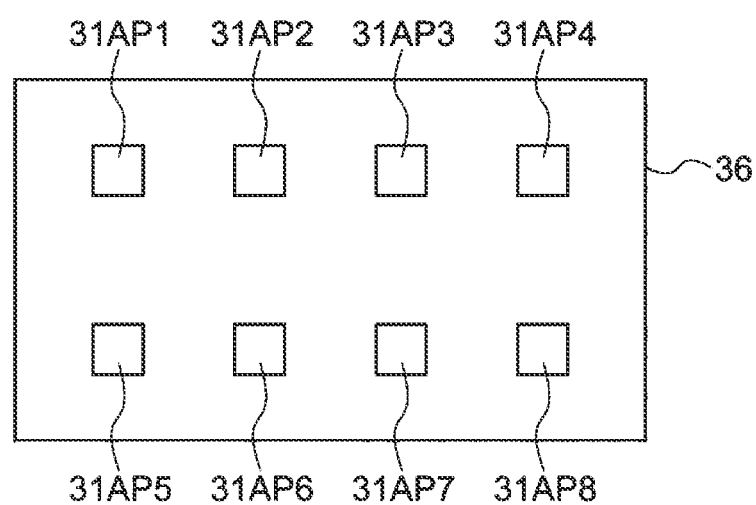
FIG. 8 is a diagram showing an initial screen of a display unit mounted on the vehicle.

The ECU 31 shown in FIG. 2 is configured to include a CPU 31A, a ROM 31B, a RAM 31C, a storage 31D, a wireless communication I/F 31E, and an input-output I/F 31F. The CPU 31A, the ROM 31B, the RAM 31C, the storage 31D, the wireless communication I/F 31E, and the input-output I/F 31F are connected so as to be able to communicate with each other via a bus 31Z. The ECU 31 can acquire information of the date and time from a timer (not shown). As shown in FIG. 8, a plurality of applications (programs) 31AP1, 31AP2, 31 AP3 . . . 31AP8 are installed in the ECU 31. 31AP1 is a lock application and 31AP2 is a driving diagnosis application.

The CPU 31A is a central processing unit that executes various programs and that controls various units. That is, the CPU 31A reads the program from the ROM 31B or the storage 31D and executes the program using the RAM 31C as a work area. The CPU 31A controls each configuration and performs various arithmetic processes (information processes) in accordance with the program recorded in the ROM 31B or the storage 31D.

The ROM 31B stores various programs and various data. The RAM 31C temporarily stores a program or data as a work area. The storage 31D is composed of a storage device such as a hard disk drive (HDD) or a solid state drive (SSD), and stores various programs and various data. The communication I/F 31E is an interface for the ECU 31 to communicate with other devices. The input-output I/F 31F is an interface for communicating with various devices.

The wheel speed sensor 32, the accelerator operation amount sensor 33, the steering angle sensor 34, the GPS receiver 37, the shift lever position sensor 40, the brake pedal force sensor 41, and the above-described other detection unit repeatedly detect, every time a predetermined time elapses, a physical amount that changes based on at least one of traveling, steering, and braking of the vehicle 30 or a physical amount that changes due to a predetermined operation member (such as a shift lever) being operated. The vehicle 30 is provided with four wheel speed sensors 32. Each wheel speed sensor 32 detects a wheel speed of corresponding one of the four wheels of the vehicle 30. The accelerator operation amount sensor 33 detects an accelerator operation amount. The steering angle sensor 34 detects a steering angle of a steering wheel. By receiving a GPS signal transmitted from a GPS satellite, the GPS receiver 37 acquires information of a position where the vehicle 30 is traveling (hereinafter, referred to as "position information"). The shift lever position sensor 40 detects a position of the shift lever (not shown). The brake pedal force sensor 41 detects a brake pedal force input by a driver to a brake pedal (not shown). The above-described other detection unit detects, for example, a traveling distance and fuel efficiency of the vehicle 30. The detected values detected by the wheel speed sensor 32, the accelerator operation amount sensor 33, the steering angle sensor 34, the GPS receiver 37, the shift lever position sensor 40, the brake pedal force sensor 41, and the above-described other detection unit are transmitted to the ECU 31 via a controller area network (CAN) provided in the vehicle 30 and are stored in the storage 31D of the ECU 31.

The display unit 36 (touch panel) can display various images (moving images). The display unit 36 is provided on, for example, an instrument panel. The first wireless communication device 38 and a mobile terminal (operation terminal) 80 described later perform data communication via the network. The second wireless communication device 39 performs short-range wireless communication with the mobile terminal 80 positioned in the vehicle cabin of the vehicle 30. For example, the second wireless communication device 39 can execute short-range wireless communication using Bluetooth (registered trademark) with a second transmission-reception unit 84 of the mobile terminal 80.

Figure 3:
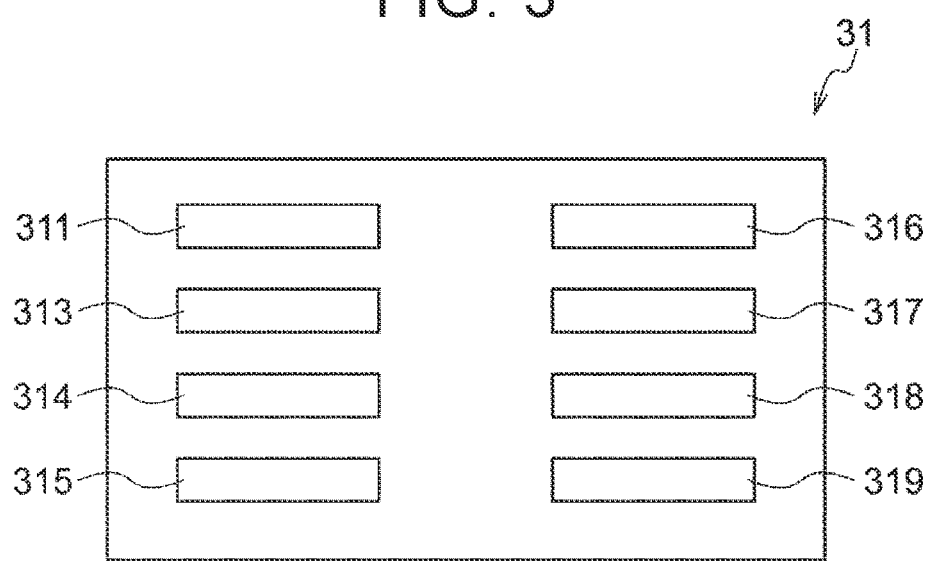
FIG. 3 is a functional block diagram of an ECU mounted on a type 1 vehicle.
Figure 4:
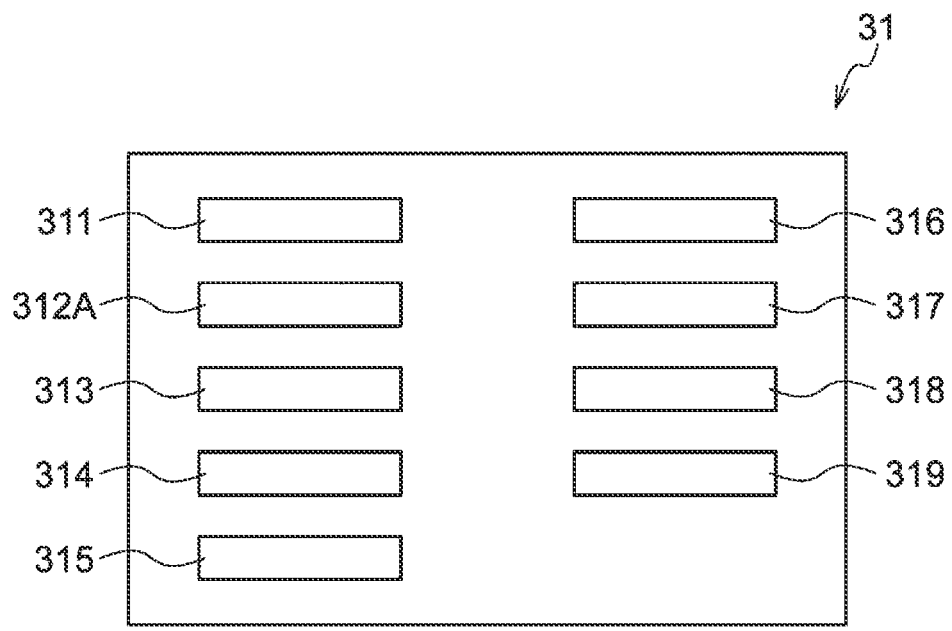
FIG. 4 is a functional block diagram of an ECU mounted on a type 2 vehicle.
Figure 5:
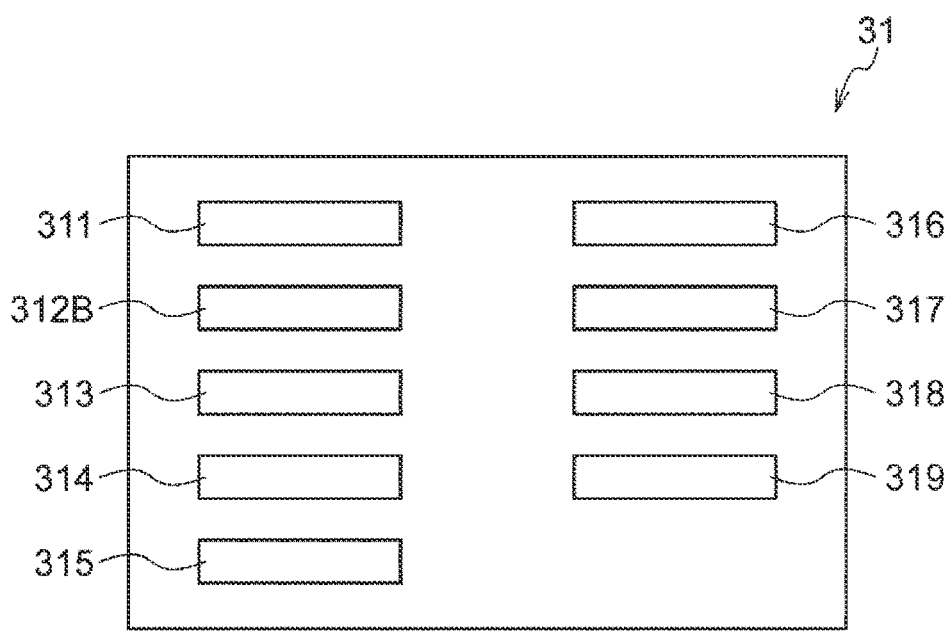
FIG. 5 is a functional block diagram of an ECU mounted on a type 3 vehicle.

FIGS. 3 to 5 show an example of a functional configuration of the ECU 31 of the vehicle 30 by a block diagram. As the functional configuration, the ECU 31 has a relevance determination unit 311, a lock determination unit 313, a level determination unit 314, a travel detection unit 315, an IG detection unit 316, an event identification unit 317, a designation unit 318, and a determination prohibition unit 319. Further, the ECU 31 of the second type vehicle 30B shown in FIG. 4 has a setting unit 312A. Moreover, the ECU 31 of the second type vehicle 30C shown in FIG. 5 has a setting unit 312B. The relevance determination unit 311, the setting unit 312A, the setting unit 312B, the lock determination unit 313, the level determination unit 314, the travel detection unit 315, the IG detection unit 316, the event identification unit 317, the designation unit 318, and the determination prohibition unit 319 are realized by the CPU of the ECU 31 reading and executing the program stored in the ROM. Functions of the relevance determination unit 311, the setting unit 312A, the setting unit 312B, the lock determination unit 313, the level determination unit 314, the travel detection unit 315, the IG detection unit 316, the event identification unit 317, the designation unit 318, and the determination prohibition unit 319 will be described later.

Detected value data that is data indicating detected values detected by the wheel speed sensor 32, the accelerator operation amount sensor 33, the steering angle sensor 34, the GPS receiver 37, the shift lever position sensor 40, the brake pedal force sensor 41, and the other detection unit of the vehicle 30 is sequentially recorded in the storage 31D. As will be described later, when the IG switch 35 is switched from an on position to an off position, all the detected value data recorded in the storage 31D while the IG switch 35 is in the on position is transmitted from the first wireless communication device 38 to the driving diagnosis device 10 (transmission-reception unit 11) via the network and is recorded in the storage of the driving diagnosis device 10. All the detected value data recorded in the storage of the driving diagnosis device 10 includes information of the vehicle ID, information of the acquired time, and position information acquired by the GPS receiver 37.

The driving diagnosis device 10 and the mobile terminal 80 shown in FIG. 1 can be connected to the above network. The driving diagnosis device 10 is managed by a subject A that is a manufacturer of the vehicle 30. Similar to the ECU 31, the driving diagnosis device 10 is configured to include a CPU, a ROM, a RAM, a storage, a communication I/F, and an input-output I/F. The CPU, the ROM, the RAM, the storage, the communication I/F, and the input-output I/F are connected to each other so as to be able to communicate with each other via a bus. The driving diagnosis device 10 and the mobile terminal 80 can acquire information of the date and time from a timer (not shown).

Figure 6:
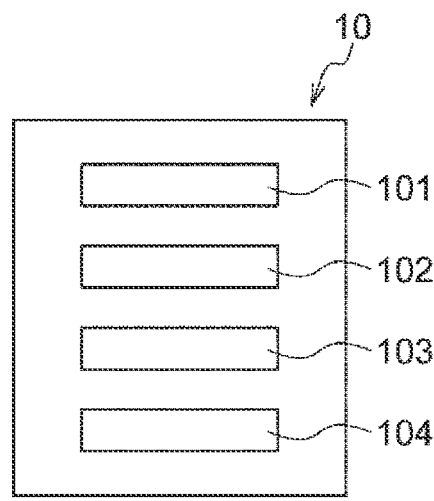
FIG. 6 is a functional block diagram of the driving diagnosis device shown in FIG. 1.

FIG. 6 shows an example of a functional configuration of the driving diagnosis device 10 by a block diagram. As a functional configuration, the driving diagnosis device 10 has a diagnosis unit (bonus determination unit) 101, an event determination unit 102, a change element giving unit 103, and a transmission-reception control unit 104. The diagnosis unit 101, the event determination unit 102, the change element giving unit 103, and the transmission-reception control unit 104 are realized by the CPU reading and executing the program stored in the ROM. The functions of the diagnosis unit 101, the event determination unit 102, the change element giving unit 103, and the transmission-reception control unit 104 will be described later.

The mobile terminal 80 shown in FIG. 1 is provided with a display unit 81 including a touch panel. The display unit 81 is connected to an input-output I/F of the mobile terminal 80. Further, the mobile terminal 80 is provided with a lock switch 82. Moreover, the mobile terminal 80 has a first transmission-reception unit 83 and a second transmission-reception unit 84.

Figure 7:
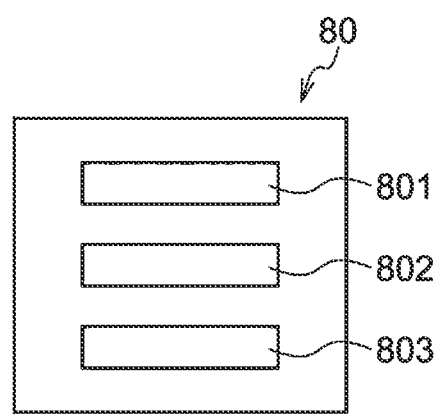
FIG. 7 is a functional block diagram of the mobile terminal shown in FIG. 1.

FIG. 7 shows an example of a functional configuration of the mobile terminal 80 by a block diagram. As a functional configuration, the mobile terminal 80 has a first transmission-reception control unit 801, a second transmission-reception control unit 802, and a display unit control unit 803. The first transmission-reception control unit 801, the second transmission-reception control unit 802, and the display unit control unit 803 are realized by the CPU reading and executing the program stored in the ROM. The mobile terminal 80 is owned by, for example, the driver of the vehicle 30 provided with the vehicle ID. A predetermined driving diagnosis display application and a predetermined game application are installed on the mobile terminal 80.

The display unit control unit 803 controls the display unit 81. That is, for example, the display unit control unit 803 causes the display unit 81 to display information that the first transmission-reception unit 83 controlled by the first transmission-reception control unit 801 has received from the transmission-reception unit 11, information that the second transmission-reception unit 84 controlled by the second transmission-reception control unit 802 has received from the second wireless communication device 39, and information input via the display unit 81 (touch panel). The information input by the display unit 81 (touch panel) can be transmitted by the first transmission-reception unit 83 to the transmission-reception unit 11 controlled by the transmission-reception control unit 104, and can be transmitted by the second transmission-reception unit 84 to the second wireless communication device 39.

Operation and Effects

Next, the operation and effects of this embodiment will be described.

First, the flow of a process performed by the ECU 31 of the vehicle 30 will be described with reference to a flowchart of FIG. 20. When the IG detection unit 316 detects that the IG switch 35 is switched from the off position to the on position, the ECU 31 repeatedly executes the process of the flowchart of FIG. 20 every time a predetermined time elapses.

In step S10, the relevance determination unit 311 determines whether the lock application 31AP1 is activated. When an occupant touches the lock application 31AP1 (display unit 36) shown in FIG. 8 with their hand, the lock application 31AP1 is activated.

The ECU 31 that makes the determination "YES" in step S10 proceeds to step S11, and the relevance determination unit 311 determines whether the mobile terminal 80 positioned in the vehicle cabin of the vehicle 30 and the vehicle 30 are related. Specifically, the relevance determination unit 311 determines whether ID information of the mobile terminal 80 and ID information of the vehicle 30 match, in which the ID information of the mobile terminal 80 is included in a wireless signal transmitted from the second transmission-reception unit 84 of the mobile terminal 80 to the second wireless communication device 39.

The ECU 31 that makes the determination "YES" in step S11 proceeds to step S12, and determines whether the wireless signal transmitted from the second transmission-reception unit 84 to the second wireless communication device 39 includes a lock signal. When the lock switch 82 provided in the mobile terminal 80 is moved from the off position to the on position, the mobile terminal 80 is in a single lock state in which all operations except for moving the lock switch 82 to the off position are prohibited. This single lock state is a lock state based only on the function of the mobile terminal 80. When the mobile terminal 80 is in the single lock state, the wireless signal includes the lock signal.

The ECU 31 that makes the determination "YES" in step S12 proceeds to step S13, and the lock determination unit 313 determines that "the mobile terminal 80 is in the single lock state". Further, the level determination unit 314 recognizes that a lock point of the single lock state is "1" with reference to a lock determination map 42 shown in FIG. 9, and sets the lock point to "1". The lock determination map 42 defines the lock points of the single lock state, the first linkage lock state, and the second linkage lock state. The stronger the lock state, the larger the lock point value. As it is clear from the lock determination map 42, the strength level of the single lock state is the weakest among the three lock states.

When the ECU 31 makes the determination "NO" in step S12 or when the process of step S13 is completed, the ECU 31 proceeds to step S14. In step S14, the lock determination unit 313 determines whether the vehicle 30 has the first linkage lock function. As described above, the vehicle 30B has the first linkage lock function that is a lock function based on the function of the vehicle 30B. Thus, when the vehicle 30 on which the ECU 31 is mounted is the vehicle 30B, the ECU 31 makes the determination "YES" in step S14. Here, the first linkage lock function is a function of the second wireless communication device 39 transmitting a first linkage lock signal generated by the setting unit 312A to the second transmission-reception unit 84, when the travel detection unit 315 of the ECU 31 determines that the vehicle 30B is traveling based on the information transmitted from the wheel speed sensor 32.

The ECU 31 that makes the determination "YES" in step S14 proceeds to step S15. The second wireless communication device 39 of the vehicle 30B that has proceeded to step S15 constantly transmits the first linkage lock signal to the second transmission-reception unit 84 when the vehicle 30B is in the traveling state. The mobile terminal 80 that has received the first linkage lock signal is put into the first linkage lock state. The mobile terminal 80 that is in the first linkage lock state is prohibited from performing all operations except for moving the lock switch 82 to the off position. Thus, when the vehicle 30B is traveling, even when the lock switch 82 is moved to the off position, all operations of the mobile terminal 80 are prohibited.

The ECU 31 that has completed the process of step S15 proceeds to step S16, recognizes that the lock point of the first linkage lock state is "2" by the level determination unit 314 referring to the lock determination map 42, and adds "2" to the lock point.

The ECU 31 that has completed the process of step S16 proceeds to step S17, and the level determination unit 314 calculates the total number of lock points. Here, it is assumed that the determination "YES" is made in step S12. The total number of points in this case is "3". Further, as shown in FIG. 10, in step S17, the display unit 36 displays all of the current lock states (the single lock state and the first linkage lock state), the lock points of each lock state, and the total number of lock points.

In contrast, the ECU 31 that makes the determination "NO" in step S14 proceeds to step S18. When the vehicle 30 on which the ECU 31 is mounted is the vehicle 30C, the ECU 31 makes the determination "YES" in step S18 and proceeds to step S19. As described above, the vehicle 30C has the second linkage lock function that is a lock function based on the function of the vehicle 30C. Here, the second linkage lock function is a function of the second wireless communication device 39 transmitting a second linkage lock signal generated by the setting unit 312B to the second transmission-reception unit 84, when the IG detection unit 316 of the ECU 31 determines that the IG switch 35 is in the on position. The second wireless communication device 39 of the vehicle 30C that has proceeded to step S19 constantly transmits the second linkage lock signal to the second transmission-reception unit 84, when the IG switch 35 is in the on position. The mobile terminal 80 that has received the second linkage lock signal is put into the second linkage lock state. The mobile terminal 80 in the second linkage lock state is prohibited from performing all operations except for moving the lock switch 82 to the off position. Thus, when the IG switch 35 is in the on position, even when the lock switch 82 is moved to the off position, all operations of the mobile terminal 80 are prohibited.

The ECU 31 that has completed the process of step S19 proceeds to step S20, recognizes that the lock point in the second linkage lock state is "3" by the level determination unit 314 referring to the lock determination map 42, and adds "3" to the lock point.

The ECU 31 that has completed the process of step S20 proceeds to step S17, and the level determination unit 314 calculates the total number of lock points. Here, it is assumed that the determination "YES" is made in step S12. The total number of points in this case is "4". Further, in step S17, the display unit 36 displays all of the current lock states (the single lock state and the second linkage lock state), the lock points of each lock state, and the total number of lock points.

When the ECU makes the determination "NO" in steps S10, S11, and S18, or when the process of step S17 is completed, the ECU 31 proceeds to step S21, and the IG detection unit 316 determines whether the IG switch 35 is switched to the off position. The ECU 31 that makes the determination "YES" in step S21 proceeds to step S22, and the first wireless communication device 38 transmits information of the total number of points to the transmission-reception unit 11 of the driving diagnosis device 10.

Figure 20:
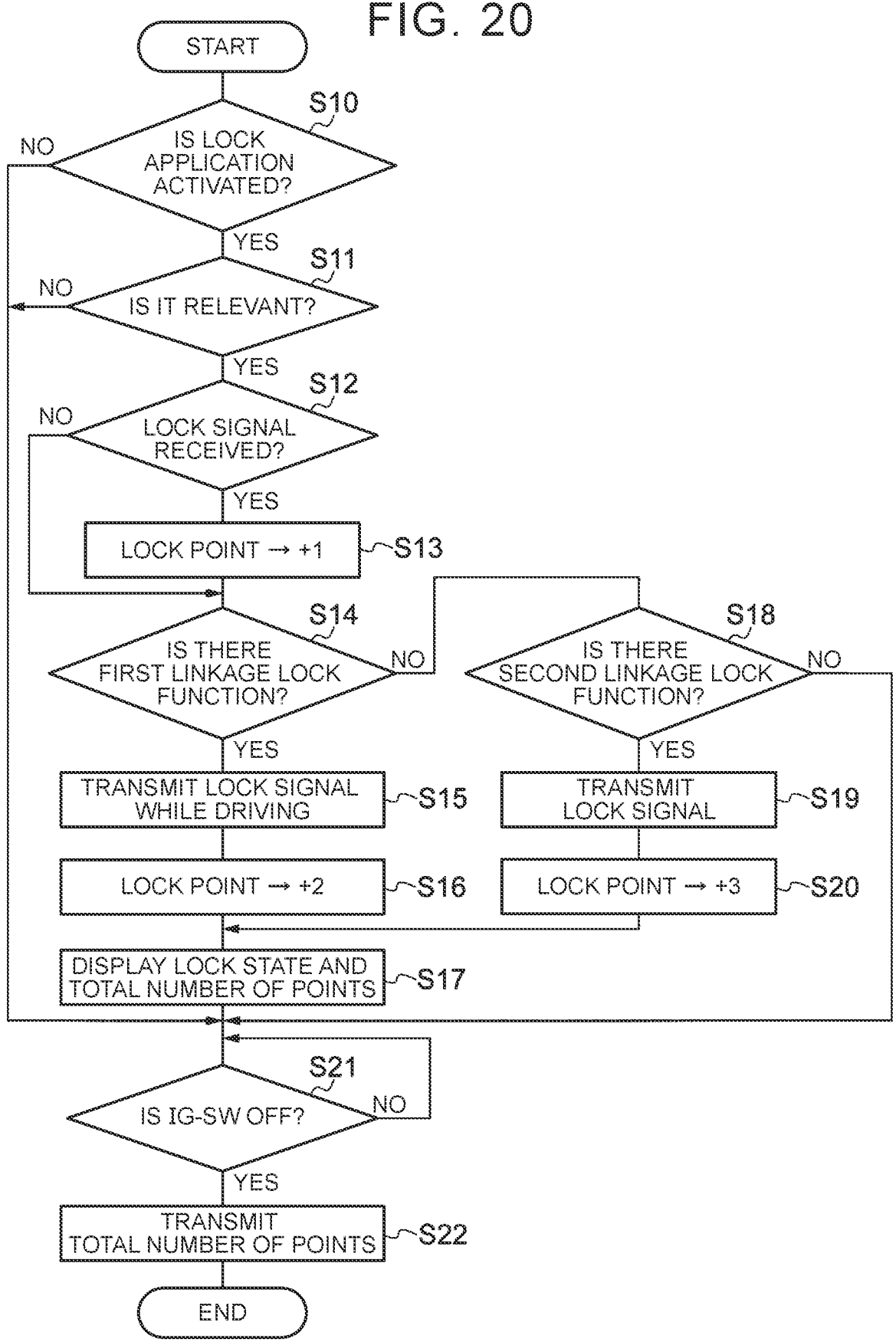
FIG. 20 is a flowchart showing a process executed by the ECU.

When the process of step S22 is completed, the ECU 31 temporarily ends the process of the flowchart of FIG. 20.

Next, the flow of the process performed by the ECU 31 of the vehicle 30 will be described with reference to a flowchart of FIG. 21. When the IG detection unit 316 detects that the IG switch 35 is switched from the off position to the on position, the ECU 31 repeatedly executes the process of the flowchart of FIG. 21 every time a predetermined time elapses.

In step S30, the relevance determination unit 311 determines whether the driving diagnosis application 31AP2 is activated. When the occupant touches the driving diagnosis application 31AP2 (display unit 36) shown in FIG. 8 with their hand, the driving diagnosis application 31AP2 is activated. When the driving diagnosis application 31AP2 is activated, the display unit 36 displays a course selection screen 43 shown in FIG. 11. The course selection screen 43 includes a first selection unit 44 and a second selection unit 45.

The ECU 31 that makes the determination "YES" in step S30 proceeds to step S31, and the designation unit 318 determines whether the first selection unit 44 has been selected. That is, the designation unit 318 determines whether the occupant has touched the first selection unit 44 with their hand.

The ECU 31 that makes the determination "YES" in step S31 proceeds to step S32, and the designation unit 318 sets a course flag to "0". The initial value of the course flag is 0.

The ECU 31 that has completed the process of step S32 proceeds to step S33, and the IG detection unit 316 determines whether the IG switch 35 is switched to the off position.

The ECU 31 that makes the determination "YES" in step S33 proceeds to step S34, and the first wireless communication device 38 transmits, to the transmission-reception unit 11 of the driving diagnosis device 10, course flag information and all the detected value data recorded in the storage 31D while the IG switch 35 is in the on position.

In contrast, the ECU 31 that makes the determination "NO" in step S31 proceeds to step S35, and the designation unit 318 determines whether the second selection unit 45 is selected. That is, the designation unit 318 determines whether the occupant has touched the second selection unit 45 with their hand.

The ECU 31 that makes the determination "YES" in step S35 proceeds to step S36, and the designation unit 318 sets the course flag to "1".

Figure 12:
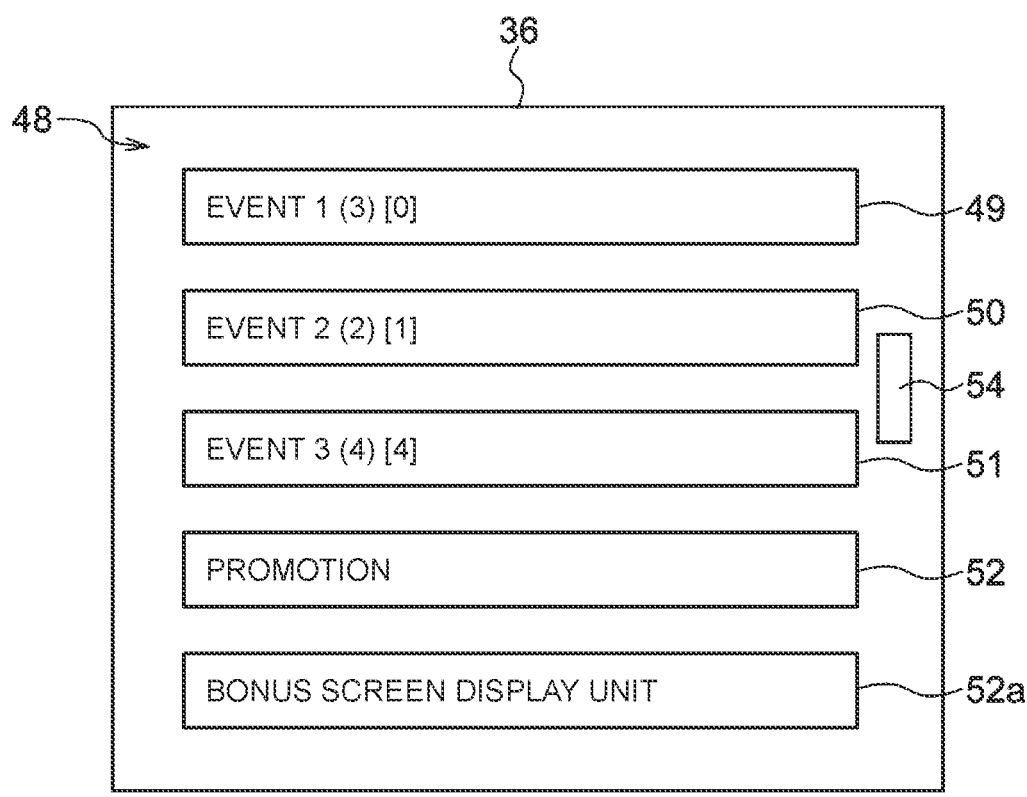
FIG. 12 is a diagram showing the display unit displaying an event selection screen.

The ECU 31 that has completed the process of step S36 proceeds to step S37, and the display unit 36 displays an event selection screen 48 shown in FIG. 12. The event selection screen 48 includes an event 1 selection unit 49, an event 2 selection unit 50, an event 3 selection unit 51, a promotion selection unit 52, a bonus screen selection unit 52a, and a return selection unit 54.

When the occupant touches any of the event 1 selection unit 49, the event 2 selection unit 50, and the event 3 selection unit 51 with their hand, one of the events 1 to 3 is selected. The event is executed in conjunction with the driving of the vehicle 30 while the vehicle 30 travels from a current position to a predetermined destination. For example, the behavior (movement) of the vehicle 30, the behavior of the occupant, and the like are included in the event. The content of the events 1 to 3 is as follows. In the following description, the content of each event may be referred to as "event information". Each of the event information of the events 1 to 3 is displayed on the display unit 36 when the occupant touches any of the event 1 selection unit 49, the event 2 selection unit 50, and the event 3 selection unit 51 (not shown in FIG. 12).

Event 1 (event information 1): Let's suppress the activation of a pre-crash safety system (PCS) to one time or less
Event 2 (event information 2): Let's keep the number of sudden steering execution times to three times or less
Event 3 (event information 3): Let's keep the number of sudden start execution times to five times or less When the occupant touches the return selection unit 54, the display unit 36 displays the course selection screen 43 again.

Figure 15:
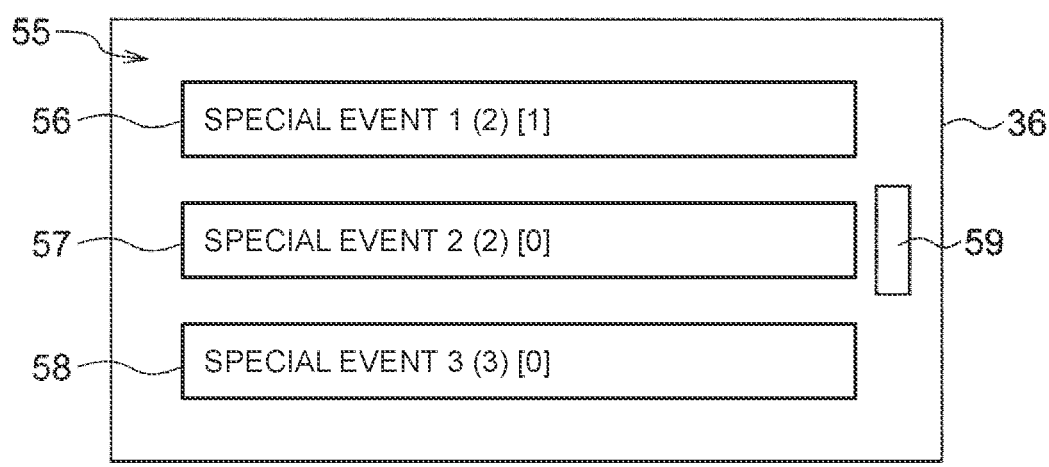
FIG. 15 is a diagram showing the display unit displaying a promotion selection screen.

Further, when the occupant touches the promotion selection unit 52 with their hand while the display unit 36 is displaying the event selection screen 48, the display unit 36 displays a promotion selection screen 55 shown in FIG. 15. The promotion selection screen 55 includes a special event 1 selection unit 56, a special event 2 selection unit 57, a special event 3 selection unit 58, and a return selection unit 59.

When the occupant touches any of the special event 1 selection unit 56, the special event 2 selection unit 57, and the special event 3 selection unit 58 with their hand, one of the special events 1 to 3 is selected. The content of the special events 1 to 3 is as follows. In the following description, the content of each special event may be referred to as "event information". Each of the event information of the special events 1 to 3 is displayed on the display unit 36 when the occupant touches any of the special event 1 selection unit 56, the special event 2 selection unit 57, and the special event 3 selection unit 58 (not shown in FIG. 15). The special event is a type of an event and is an event that is executed only for a predetermined period. This predetermined period is, for example, one month.

Special event 1 (event information 4): Let's keep the number of sudden braking execution times to three times or less
Special event 2 (event information 5): Let's keep the number of reversing operation execution times to three times or less
Special event 3 (event information 6): Let's keep the number of U-turn execution times to one time or less When any one event (special event) is selected by the occupant in step S37, the ECU 31 proceeds to step S38. The numbers in parentheses shown in FIGS. 12 and 15 are the limited number of times for each event (special event). The numbers in square brackets shown in FIGS. 12 and 15 are the number of execution times executed by the occupant of the vehicle 30 so far. In step S38, the determination prohibition unit 319 determines whether the number of execution times of the event (special event) selected in step S37 is equal to or more than a predetermined plurality of times.

The ECU 31 that makes the determination "YES" in step S38 proceeds to step S39, and determines whether a predetermined billing process has been performed after the number of execution times exceeds the limited number of times for the event (special event) executed for the limited number of times or more. The billing process can be performed by, for example, electronic money. When billing is performed, a charge server (not shown) that is capable of communicating with the driving diagnosis device 10 and the vehicle 30 via the Internet executes the billing process. When the billing process is executed, the information is transmitted from the billing server to the ECU 31 of the vehicle 30 and is recorded in the storage 31D. Thus, the determination prohibition unit 319 determines whether there has been the billing process for the selected event (special event) by referring to the storage 31D.

The ECU 31 that makes the determination "YES" in step S39 proceeds to step S40, and determines whether a confirmation switch unit 46 included in the course selection screen 43 has been touched by the occupant. When the return selection unit 54 is touched while the display unit 36 is displaying the event selection screen 48, the display unit 36 displays the course selection screen 43 again. When the return selection unit 59 is touched while the display unit 36 is displaying the promotion selection screen 55, the display unit 36 displays the course selection screen 43 again.

For example, when the event 1 is selected in step S37 and the confirmation switch unit 46 is touched, it is confirmed that only the event 1 is selected in step S40. In contrast, when the ECU 31 makes the determination "NO" in step S40, the ECU 31 performs the process of step S37 again. Thus, the occupant can select a plurality of events (special events) from the events 1 to 3 and the special events 1 to 3.

Figure 13:
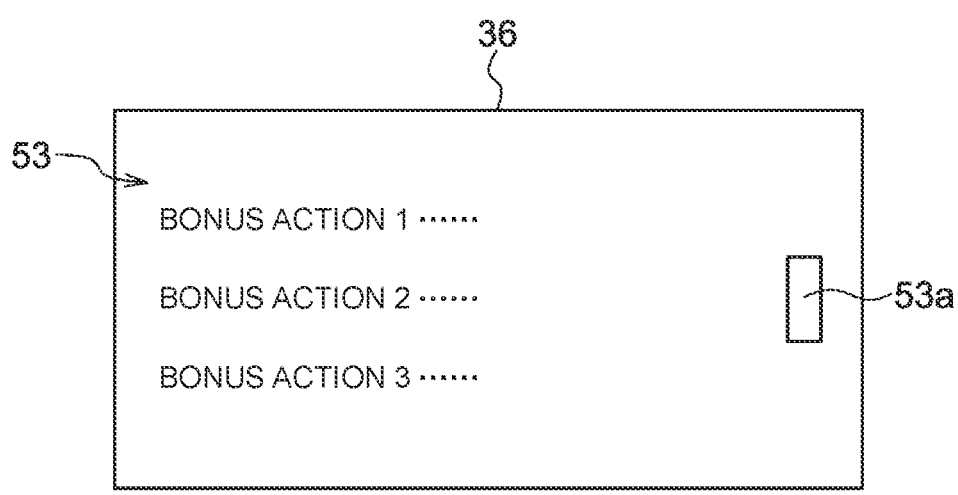
FIG. 13 is a diagram showing the display unit displaying a bonus screen.

When the occupant touches the bonus screen selection unit 52a when the event selection screen 48 is displayed on the display unit 36, a bonus screen 53 shown in FIG. 13 is displayed on the display unit 36. As shown in FIG. 13, three bonus actions are displayed on the bonus screen 53. The content of each bonus action is as follows.

Bonus action 1: Perform at least one of vehicle inspection and maintenance
Bonus action 2: Go to store
Bonus action 3: Drive for only a traveling distance that is equal to or more than a predetermine distance and keep the fuel efficiency below a predetermined value When the occupant touches the return selection unit 53a, the display unit 36 displays the course selection screen 43 again.

Figure 14:
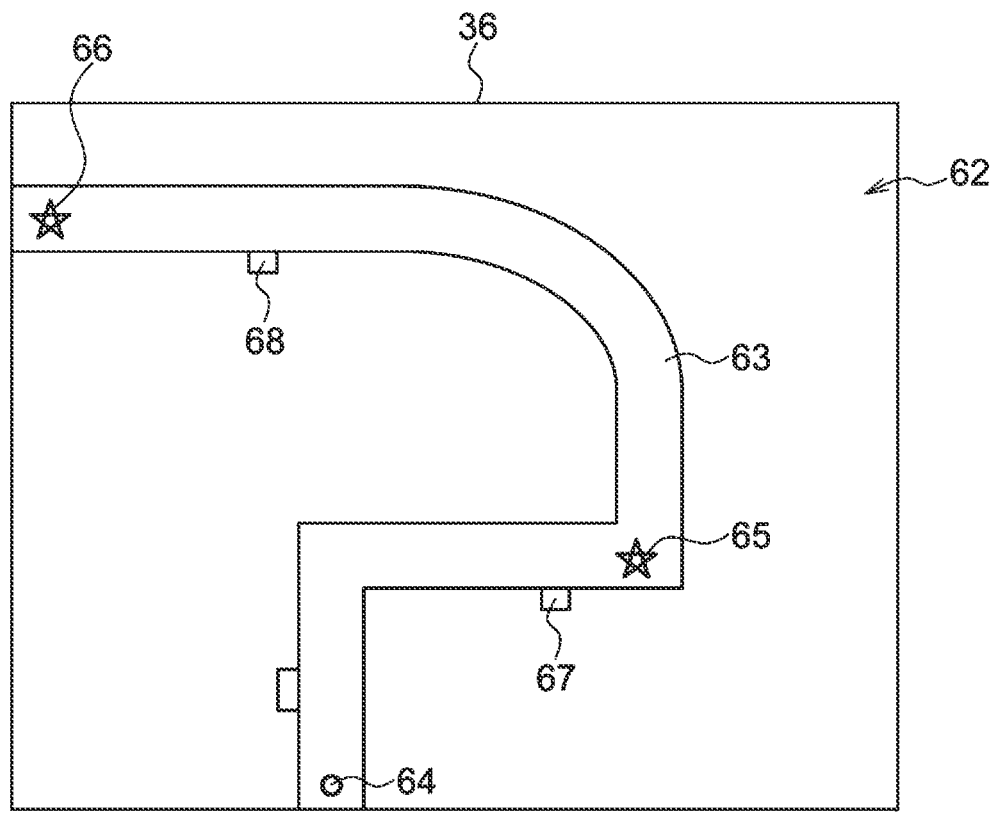
FIG. 14 is a diagram showing the display unit when an event 1 and a special event 2 are selected.

For example, it is assumed that the occupant selects the event 1 and the special event 2 and then touches the confirmation switch unit 46 in step S40. In this case, a map image 62 shown in FIG. 14 is displayed on the display unit 36. One road 63 is drawn in this map image 62. Further, a current position 64 of the vehicle 30, a first destination 65, and a second destination 66 are displayed on the road 63. Further, the map image 62 includes the store 67 and an automobile maintenance factory 68 arranged along the road 63. The map image 62 is an image based on map data recorded in the storage 31D of the vehicle 30 or map data received from a Web server by the first wireless communication device 38. The destination of the event 1 is the first destination 65, and the destination of the special event 2 is the second destination 66.

When the vehicle 30 departing from the current position 64 has stopped by the store 67 (predetermined place), the bonus action 2 is achieved. A store clerk of the store 67 transmits information indicating that the vehicle 30 has stopped by the store 67 to the driving diagnosis device 10 by using, for example, a communication device installed in the store 67.

The event 1 is achieved when the ECU 31 does not detect that the PCS has been activated before the current position 64 reaches the first destination 65. When the PCS is activated, the PCS recording signal generated by the ECU 31 is included in the detected value data.

When the vehicle 30 departing from the current position 64 stops by the automobile maintenance factory 68 and the vehicle 30 undergoes at least one of inspection and maintenance at the automobile maintenance factory 68, the bonus action 1 is achieved. A store clerk of the automobile maintenance factory 68 transmits information indicating that the vehicle 30 has undergone at least one of inspection and maintenance at the automobile maintenance factory 68 to the driving diagnosis device 10 by using, for example, a communication device installed in the automobile maintenance factory 68.

The special event 2 is achieved when the number of times a reversing movement of the vehicle 30 is executed before the current position 64 reaches the automobile maintenance factory 68 is three times or less. When the vehicle 30 performs the reversing movement, the shift lever position sensor 40 outputs a signal indicating that the shift lever is positioned at an R position (reverse gear). This signal is the detected value data.

Further, the ECU 31 that makes the determination "NO" in step S39 proceeds to step S41, and the determination prohibition unit 319 determines whether a predetermined time has elapsed from the time when the event (special event) in which the determination "YES" was made in step S38 was last selected. This predetermined time is, for example, 30 days.

The ECU 31 that makes the determination "YES" in step S41 sets the number of execution times of the event (special event) in which the determination "YES" was made to "0", and proceeds to step S40. In contrast, the ECU 31 that makes the determination "NO" in step S41 proceeds to step S37. That is, in this case, the event (special event) selected in step S37 cannot be the target of the driving diagnosis described later.

Further, the ECU 31 that makes the determination "YES" in step S40 proceeds to step S42. The ECU 31 that makes the determination "YES" in step S42 proceeds to step S43, and the first wireless communication device 38 transmits the course flag information, all detected value data recorded in the storage 31D while the IG switch 35 is in the on position, and the event information of the selected event (special event) to the transmission-reception unit 11 of the driving diagnosis device 10.

Figure 21:
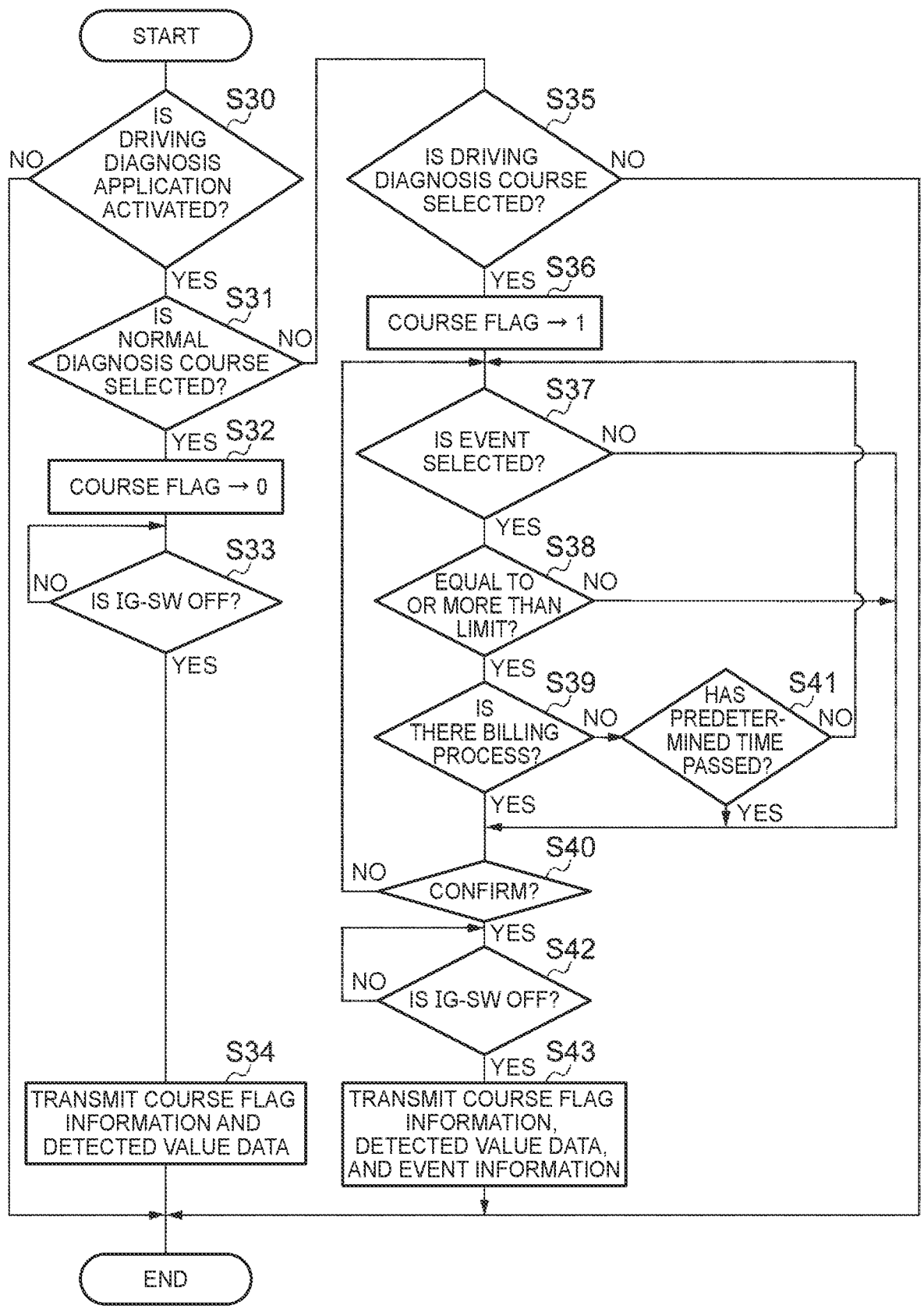
FIG. 21 is a flowchart showing a process executed by the ECU.

When the determination "NO" is made in steps S30 and S35, or when the processes of steps S34 and S43 are completed, the ECU 31 temporarily ends the process of the flowchart of FIG. 21.

An event candidate that is a candidate for the event (special event) displayed on the display unit 36 is generated on a server (not shown) on which the driving diagnosis device 10 and the vehicle 30 can communicate with each other via the Internet. The vehicle 30 sequentially receives the updated information of the event candidate from the server, and records the information of the event candidate in the storage 31D. However, the types of events that each vehicle 30 can handle differ depending on the specifications of each vehicle 30. For example, it is assumed that the event candidate specifying that the PCS is not operated is recorded in the storage 31D. However, when the vehicle 30 equipped with the storage 31D does not have the PCS, the driver of the vehicle 30 cannot execute the event of the content specified by the event candidate. Thus, the event identification unit 317 of the ECU 31 selects the content of the event to be displayed on the display unit 36 from an event candidate group based on specification information of the vehicle 30, and makes the display unit 36 display only the event (special event) that can be executed by the driver.

Further, the designation unit 318 of the vehicle 30 selects a special event from all the events and displays it on the promotion selection screen 55. That is, the designation unit 318 designates some events as special events. The designation unit 318 periodically changes the content of the special event. That is, any one of the events 1 to 3 shown in FIG. 12 may be displayed on the promotion selection screen 55 as the special event in the future. Similarly, there is a possibility that any one of the special events 1 to 3 shown in FIG. 15 is displayed on the event selection screen 48 as the event (that is not the special event) in the future. Further, there is possibility that an event in which the content is different from the events displayed on the event selection screen 48 and the promotion selection screen 55 is displayed on the event selection screen 48 in the future by the designation unit 318. Further, there is possibility that an event in which the content is different from the events displayed on the event selection screen 48 and the promotion selection screen 55 is displayed as the special event on the promotion selection screen 55 in the future by the designation unit 318.

Next, the flow of a process performed by the driving diagnosis device 10 will be described with reference to the flowchart of FIG. 22. The driving diagnosis device 10 repeatedly executes the process of the flowchart of FIG. 22 every time a predetermined time elapses.

In step S50, the diagnosis unit 101 of the driving diagnosis device 10 determines whether the transmission-reception unit 11 has received the course flag information and the detected value data. The received course flag information and detected value data are recorded in the storage of the driving diagnosis device 10 while being associated with the vehicle ID.

Further, the driving diagnosis device 10 that makes the determination "YES" in step S50 proceeds to step S51, and determines whether the course flag represented by the course flag information received by the diagnosis unit 101 is "1".

Further, the driving diagnosis device 10 that makes the determination "NO" in step S51 proceeds to step S52, and performs a driving diagnosis (first driving diagnosis) based on the detected value data received by the diagnosis unit 101. For example, as disclosed in Japanese Unexamined Patent Application Publication No. 2019-12481 (JP 2019-12481 A) and Japanese Unexamined Patent Application Publication No. 2020-95403 (JP 2020-95403 A), a driving diagnosis method that is performed based on the above-mentioned detected value data is well known. The driving diagnosis method in the present disclosure may be any method. For example, the diagnosis unit 101 performs a driving diagnosis of an accelerator operation based on the detected value of the accelerator operation amount sensor 33 and the detected value of the wheel speed sensor 32, performs a driving diagnosis of a brake operation based on the detected value of the brake pedal force sensor 41 and the detected value of the wheel speed sensor 32, and performs a driving diagnosis of a steering operation based on the detected value of the steering angle sensor 34. Further, the diagnosis unit 101 calculates the points of the accelerator operation, the brake operation, and the steering operation based on these detected values (see FIG. 16).

In contrast, the driving diagnosis device 10 that makes the determination "YES" in step S51 proceeds to step S53, and performs a driving diagnosis (second driving diagnosis) based on the detected value data received by the diagnosis unit 101. The second driving diagnosis includes the first driving diagnosis, an event diagnosis, and a bonus action diagnosis.

The event diagnosis is a diagnosis of whether the event (special event) confirmed to have been selected in step S40 of the flowchart of FIG. 21 has been executed. For example, assume that the event 1 and the special event 2 are selected. When the PCS is activated as described above, the PCS recording signal generated by the ECU 31 is included in the detected value data. Thus, the diagnosis unit 101 can recognize the number of times the PCS is activated based on the received PCS recording signal. When the diagnosis unit 101 determines that the number of times the PCS is activated is one time or less, the event determination unit 102 of the driving diagnosis device 10 determines that the event 1 has been achieved. Further, when the vehicle 30 performs the reversing movement, the shift lever position sensor 40 outputs a signal indicating that the shift lever is in the R position. This signal is received by the diagnosis unit 101 as the detected value data. Thus, the diagnosis unit 101 can recognize whether the number of times a reversing movement of the vehicle 30 is executed is three times or less based on the received signal. When the diagnosis unit 101 determines that the number of times a reversing movement is executed is three times or less, the event determination unit 102 determines that the special event 2 has been achieved.

Further, the diagnosis unit 101 performs the bonus action diagnosis. For example, as described above, when information indicating that the vehicle 30 undergoes at least one of inspection and maintenance at the automobile maintenance factory 68 is transmitted from the communication device installed in the automobile maintenance factory 68 to the driving diagnosis device 10, the diagnosis unit 101 determines that the bonus action 1 has been achieved. Further, for example, as described above, when information indicating that the vehicle 30 has stopped by the store 67 is transmitted from the communication device installed in the store 67 to the driving diagnosis device 10, the diagnosis unit 101 determines that the bonus action 2 has been achieved. Further, when the detected value data transmitted from the vehicle 30 to the driving diagnosis device 10 includes data of the traveling distance and fuel efficiency detected by the other detection unit, the diagnosis unit 101 determines that the bonus action 3 has been achieved by using the above data.

The driving diagnosis device 10 that has completed the process of step S53 proceeds to step S54, and the change element giving unit 103 determines the change element that is determined by the points of the accelerator operation, the points of the brake operation, the points of the steering operation, whether the event is achieved, and whether the bonus action is performed. This change element is an element for reflecting the result of the second driving diagnosis in a game realized by the game application installed on the mobile terminal 80. This game is a role-playing game that uses position information. That is, when the mobile terminal 80 moves, a character appearing in this game moves on the map screen displayed on the display unit 81. The ability of this character is evaluated by three factors: attack point, defense point, and hit point. In addition, the character has access to money and weapons. In addition, the character can acquire certain magic. The change elements of this embodiment contribute to raising the level of each of the above items (attack point, defense point, hit point, money, weapons, and magic) that represent the characteristics of the character. The larger the change element, the greater the degree in which the level of each item increases.

Figures 16, 17:
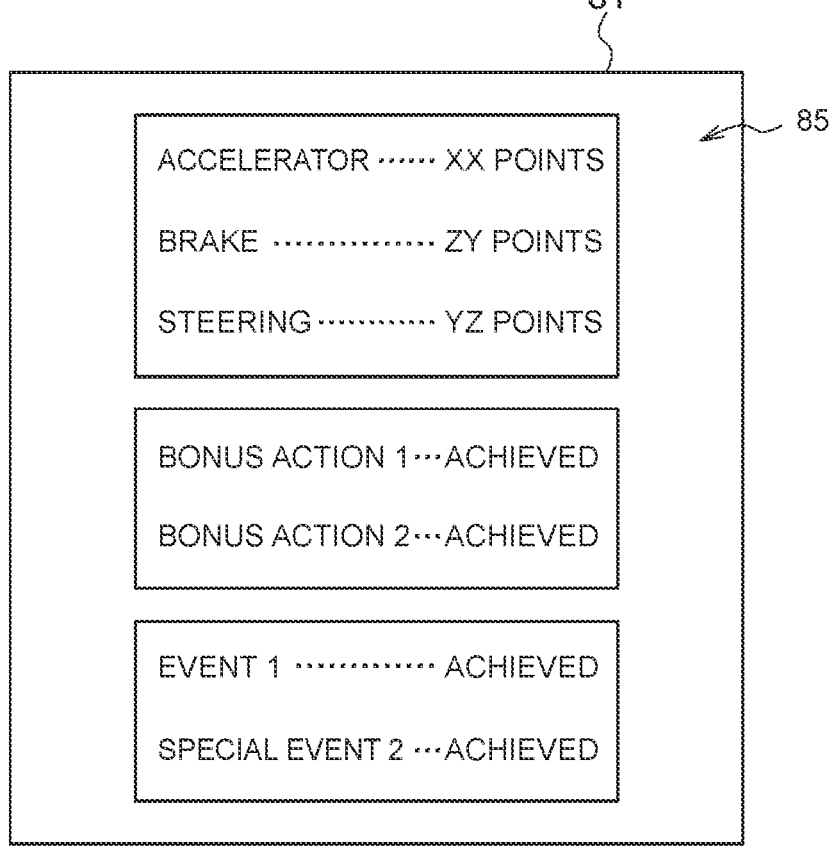
FIG. 16 is a diagram showing a display unit of the mobile terminal displaying an image of a driving diagnosis result.
FIG. 17 is a diagram showing the display unit of the mobile terminal displaying a change element.

FIG. 17 shows an example of the change element. The higher the score of the accelerator operation, the more the attack point increases. The higher the braking score, the more the defense point increases. The higher the steering operation score, the more the hit point increases. When the bonus action 1 is achieved, a predetermined amount of money is given to the character. When the bonus action 2 is achieved, a predetermined weapon is given to the character. When the event 1 is achieved, the character acquires a certain type of magic. When the special event 2 is achieved, the character acquires a certain type of magic. In the present embodiment, the change element when the special events 1 to 3 are achieved is larger than the change element when the events 1 to 3 are achieved.

The driving diagnosis device 10 that has completed the process of step S54 proceeds to step S55, and the change element giving unit 103 determines whether the transmission-reception unit 11 has received the total number of points transmitted by the vehicle 30 in step S22. The information of the received total number of points is recorded in the storage of the driving diagnosis device 10 while being associated with the vehicle ID.

Figures 18, 19:
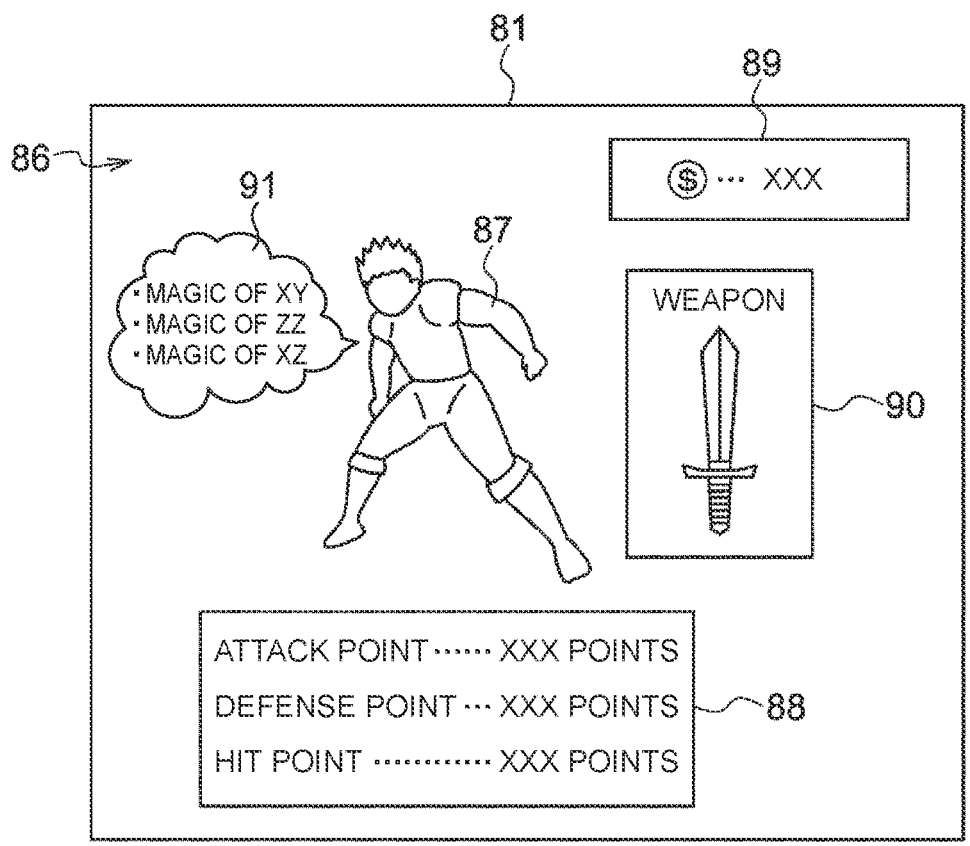
FIG. 18 is a diagram showing a coefficient map.
FIG. 19 is a diagram showing the display unit of the mobile terminal displaying a main image of a game.

Further, the driving diagnosis device 10 that makes the determination "YES" in step S55 proceeds to step S56, and the change element giving unit 103 calculates a coefficient with reference to a coefficient map 72 of FIG. 18. For example, when the total number of lock points is "4", the coefficient is "2.5". Further, when the total number of lock points is "0" due to the fact that the mobile terminal 80 positioned in the vehicle 30A is not locked, the coefficient is "0".

The driving diagnosis device 10 that has completed the process of step S52 proceeds to step S57, and the diagnosis unit 101 records the result of the first driving diagnosis in the storage. Further, the driving diagnosis device 10 that has completed the process of step S56 proceeds to step S57, the diagnosis unit 101 records the result of the second driving diagnosis in the storage, and the change element giving unit 103 records the change element and the coefficient in the storage.

The driving diagnosis device 10 that has completed the process of step S57 proceeds to step S58, and determines whether the transmission-reception unit 11 has received a diagnosis result transmission request from the mobile terminal 80.

Further, the driving diagnosis device 10 that makes the determination "YES" in step S58 proceeds to step S59. When the process of step S52 is performed, the transmission-reception unit 11 transmits the result of the first driving diagnosis to the first transmission-reception unit 83 of the mobile terminal 80. In contrast, when the process of step S56 is performed, the transmission-reception unit 11 transmits the change element and the coefficient to the first transmission-reception unit 83 as a result of the second driving diagnosis.

Figure 22:
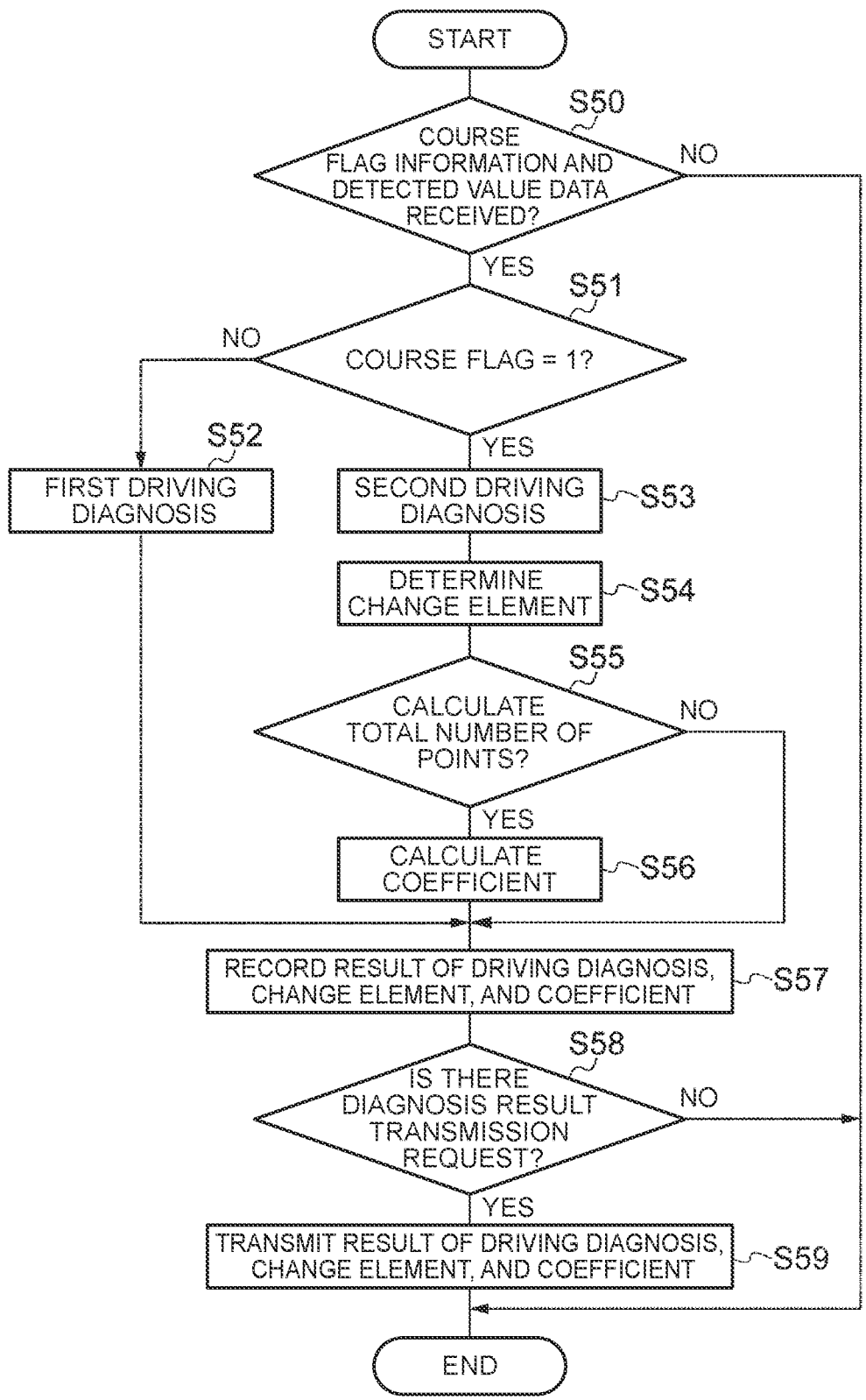
FIG. 22 is a flowchart showing a process executed by the driving diagnosis device.

When the determination "NO" is made in steps S50 and S58, or when the process of step S59 is completed, the driving diagnosis device 10 temporarily ends the process of a flowchart of FIG. 22.

Next, the flow of a process performed by the mobile terminal 80 will be described with reference to a flowchart of FIG. 23. The mobile terminal 80 repeatedly executes the process of the flowchart of FIG. 23 every time a predetermined time elapses.

In step S60, the display unit control unit 803 of the mobile terminal 80 determines whether the driving diagnosis display application is running.

The mobile terminal 80 that makes the determination "YES" in step S60 proceeds to step S61, and the first transmission-reception control unit 801 determines whether the first transmission-reception unit 83 has received the result of the driving diagnosis (first driving diagnosis or second driving diagnosis) from the driving diagnosis device 10.

The mobile terminal 80 that makes the determination "YES" in step S61 proceeds to step S62, and the display unit control unit 803 causes the display unit 81 to display the driving diagnosis result image 85 shown in FIG. 16.

Figure 23:
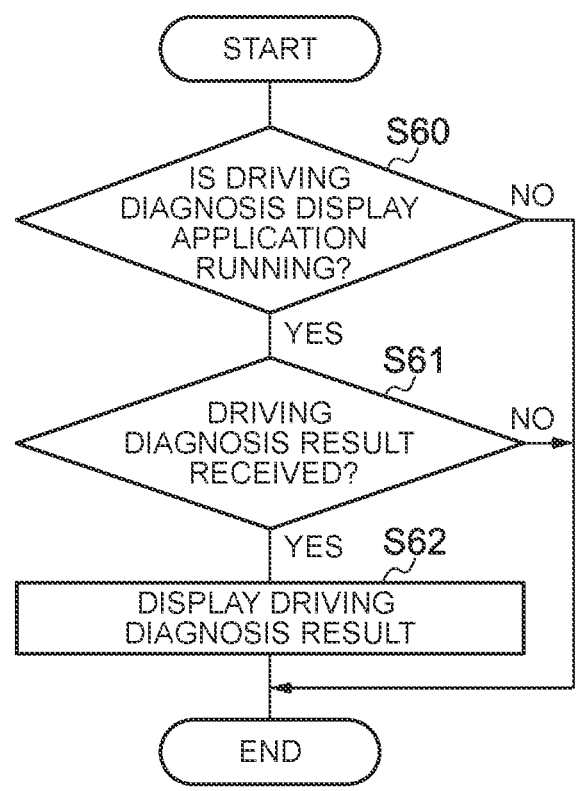
FIG. 23 is a flowchart showing a process executed by the mobile terminal.

When the determination "NO" is made in steps S60 and S61, or when the process of step S62 is completed, the mobile terminal 80 temporarily ends the process of the flowchart of FIG. 23.

Next, the flow of the process performed by the mobile terminal 80 will be described with reference to a flowchart of FIG. 24. The mobile terminal 80 repeatedly executes the process of the flowchart of FIG. 24 every time a predetermined time elapses.

In step S70, the display unit control unit 803 of the mobile terminal 80 determines whether the game application is running.

The mobile terminal 80 that makes the determination "YES" in step S70 proceeds to step S71, and the first transmission-reception control unit 801 determines whether the first transmission-reception unit 83 has received the result of the driving diagnosis (the first driving diagnosis or the second driving diagnosis) from the driving diagnosis device 10.

The mobile terminal 80 that makes the determination "YES" in step S71 proceeds to step S72 and determines whether the change element and the coefficient have been received from the driving diagnosis device 10.

The mobile terminal 80 that makes the determination "YES" in step S72 proceeds to step S73, and the display unit control unit 803 causes the display unit 81 to display a change element display image 71 (see FIG. 17) indicating the change element reflecting the coefficient. Each of the change element represented by the change element display image 71 of FIG. 17 is the change element when the coefficient is "1". For example, when the coefficient is "2", the attack point, the defense point, the hit point, and the money given to the character are twice the numerical values in FIG. 17. For example, when the coefficient is "2.5", the attack point, the defense point, the hit point, and the money given to the character are 2.5 times the numerical values in FIG. 17. When the coefficient is "2", the ability of the weapon given to the character and the magical ability acquired by the character are twice the numerical values shown in FIG. 17. When the coefficient is "2.5", the ability of the weapon given to the character and the magical ability acquired by the character are 2.5 times more than the numerical values shown in FIG. 17.

The mobile terminal 80 that has completed the process of step S73 proceeds to step S74, and the display unit control unit 803 determines whether there is a request to switch to a main image 86 generated by the operation on the display unit 81 (touch panel).

The mobile terminal 80 that makes the determination "YES" in step S74 proceeds to step S75, and the display unit control unit 803 causes the display unit 81 to display the main image 86 shown in FIG. 19. The main image 86 displayed in FIG. 19 includes a character 87, an ability display unit 88, a money display unit 89, a weapon display unit 90, and a magic display unit 91. The ability display unit 88 displays the attack point, the defense point, and the hit point reflecting the change element calculated in step S73. The money display unit 89 displays the total amount of money that reflects the change element. The weapon display unit 90 displays the weapon currently possessed by the character 87 that reflects the change element. The magic display unit 91 displays the magic that the character 87 has currently acquired, in which the change elements are reflected.

Figure 24:
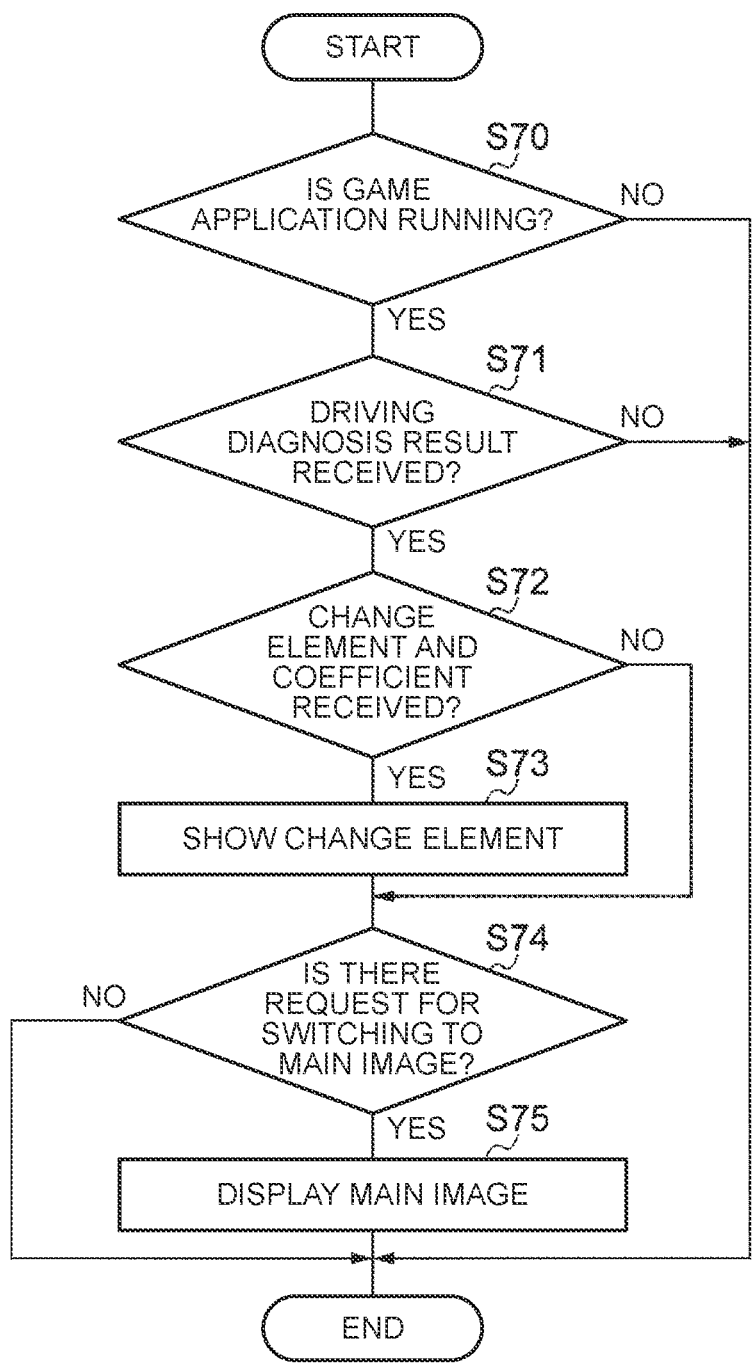
FIG. 24 is a flowchart showing a process executed by the mobile terminal.

When the determination "NO" is made in steps S70, S71, and S74, or when the process of step S75 is completed, the mobile terminal 80 temporarily ends the process of the flowchart of FIG. 24.

As described above, based on the driving operation of the vehicle 30, the diagnosis unit 101 of the driving diagnosis device 10 of the present embodiment diagnoses a plurality of driving diagnosis items (the accelerator operation, the brake operation, the steering operation, whether the event is achieved, and whether the bonus action is achieved) having different content. Further, the change element giving unit 103 gives the character 87 of the game the change element generated in accordance with the diagnosis result of each driving diagnosis item. Thus, when the diagnosis results are acquired for the driving diagnosis items, a plurality of the change elements having different content is given to the character 87. Thus, in order to give variety to the character 87, the driver needs to execute a driving operation corresponding to various driving diagnosis items. Thus, the driving diagnosis device 10 can encourage the driver to perform a driving operation such that various driving diagnosis items are diagnosed.

Further, the diagnosis unit 101 calculates the score for the driving diagnosis items based on the driving operation, and the change element giving unit 103 generates the change element in accordance with the score. Thus, the driving diagnosis device 10 can encourage the driver to perform a driving operation that gives a high score for each driving diagnosis item.

Further, when the diagnosis unit (bonus determination unit) 101 determines that the predetermined bonus action has been executed, the change element giving unit 103 gives the change element to the character 87. Thus, the driving diagnosis device 10 can encourage the driver to execute a bonus action.

Further, when the number of times the same event is executed exceeds the limited number of times, the driver is prohibited from executing the same event. Thus, the driver is likely to execute an event different from the same event. Thus, it is possible to encourage the driver to perform a driving operation in which many driving diagnosis items are diagnosed.

However, the determination prohibition unit 319 allows the driver to execute the same event when the predetermined billing process is performed after the same event has been executed a limited number of times or more. The driver may strongly desire that the same event (driving diagnosis) be performed. In such a case, the driving diagnosis device 10 allows the driver to execute the same event.

Further, the determination prohibition unit 319 allows the driver to execute the same event when a predetermined time has elapsed since the same event was executed more than the limited number of times. When the predetermined time has passed, it is significant that the same event (driving diagnosis) is executed by the driver. In such a case, the driving diagnosis device 10 allows the driver to execute the same event.

Further, the display unit 36 displays only the events that the event identification unit 317 has determined to be executable by the vehicle 30. Thus, the driver can easily recognize the executable event by looking at the display unit 36.

Further, the driver who sees the display unit 36 can recognize that a part of the plurality of events is the special event. Further, the change element that is given to the character 87 when the special event is executed is larger than the change element that is given to the character 87 when the event other than the special event is executed. Thus, it is possible to encourage the driver to execute a special event.

Further, the relevance determination unit 311 of the vehicle 30 determines whether the mobile terminal 80 is associated with the vehicle 30. Moreover, the lock determination unit 313 determines whether the operation of the mobile terminal 80 associated with the vehicle 30 is in the restricted lock state. In addition, the level determination unit 314 determines the strength level of the lock state. Further, the display unit 36 displays all the current lock states, the lock points of each lock state, and the total number of lock points. Thus, the driver can recognize the level of the lock state when the mobile terminal 80 is put in the lock state. Thus, it is possible to encourage the driver to put the mobile terminal 80 in the lock state.

Further, when the mobile terminal 80 is put in the lock state based on only the function of the mobile terminal 80, there is a possibility that the lock state is released by the driver operating the mobile terminal 80 while the vehicle 30 is traveling. Thus, the level determination unit 314 determines that the strength level of a linkage lock state (a first linkage lock state and a second linkage lock state) that is a lock state based on the function of the vehicle 30 is higher than the strength level of the single lock state that is a lock state based only on the function of the mobile terminal 80. Thus, it is possible to encourage the driver to select a linkage lock state having a higher strength level than the single lock state.

Further, there is a possibility that the first linkage lock state that is the lock state when it is detected that the vehicle 30 is traveling is released when the vehicle 30 is stopped. In contrast, there is no possibility that the second linkage lock state that is the lock state when it is detected that the IG switch 35 is positioned in the on position is released unless the IG switch 35 is operated. Thus, the level determination unit 314 determines that the strength level of the second linkage lock state is higher than the strength level of the first linkage lock state. Thus, it is possible to encourage the driver to purchase or rent the vehicle 30 that sets the mobile terminal 80 in the second linkage lock state when it is detected that the IG switch 35 is positioned in the on position.

Further, the higher the strength level of the lock state determined by the level determination unit 314, the larger the coefficient. That is, the higher the strength level, the larger the change element. Thus, it is possible to encourage the driver to select the linkage lock state (the first linkage lock state and the second linkage lock state) having a higher strength level than the single lock state.

Although the driving diagnosis device 10 and the driving diagnosis method according to the embodiment have been described above, the design of the driving diagnosis device 10 and the driving diagnosis method can be appropriately changed within a range not deviating from the scope of the present disclosure.

The driving diagnosis item performed by the driving diagnosis device 10 may be an item different from the above. For example, an event (special event) and a bonus action in which the content is different from the above may be included in the driving diagnosis item. Further, a driving operation different from the accelerator operation, the brake operation, and the steering operation may be included in the driving diagnosis item. Moreover, only a part of the accelerator operation, the brake operation, and the steering operation may be included in the driving diagnosis item. The number of events and bonus actions may be one. As the content of the event, the same content as the above bonus action may be specified. As the content of the bonus action, the same content as the above event may be specified.

The change element may be different from the above. For example, when the game allows a player who plays the game using the mobile terminal 80 to select a character different from the character 87, the change element may be the right to select a different character. In addition, the change element may be the right to draw a lottery in which money and weapons can be acquired.

The change element may be the right of the player to additionally select a character other than the character already operated in the game. For example, when a predetermined event is achieved, the change element giving unit 103 may generate a change element for the player to additionally select another character. Further, in this case, the change element giving unit 103 may be able to give various change elements to each selected character.

The game application may also be programmed so that the player can arbitrarily select a plurality of characters. That is, the player may be able to select any plurality of characters regardless of the driving diagnosis. In this case, for example, when a predetermined event is achieved, the change element giving unit 103 may be able to give the change element to at least one selected character.

Even when the change element is the right to additionally select another character or when the player can arbitrarily select multiple characters, for example, the driver needs to continue a driving operation in which various driving diagnosis items are diagnosed, in order to make another character grow after one character has grown sufficiently. That is, the driver needs to continue the driving operation using the driving diagnosis application 31AP2. Thus, the driving diagnosis device 10 of this modified example can encourage the driver to perform a driving operation such that various driving diagnosis items are diagnosed.

A driving diagnosis display application and a game application may be installed in the ECU 31 of the vehicle 30. In this case, the driving diagnosis result image 85 and the game image (such as the change element display image 71 and the main image 86) are displayed on the display unit (operation terminal) 36.

The event determination unit 102 may be able to recognize the accuracy of determining whether an event has been executed for each event. In this case, when an event with a high determination accuracy (second event) is achieved among a plurality of events, the change element generated by the change element giving unit 103 may be larger than the change element when the event (first event) having a determination accuracy lower than the second event is achieved. The determination accuracy may be decided in accordance with the type of information for making the determination. For example, when the data on which the determination of whether the event has been achieved is based is the data detected by the detection unit of the vehicle 30, the determination accuracy of this determination is high. In contrast, when the data on which the determination of whether the event has been achieved is based is different from the data detected by the detection unit of the vehicle 30, the determination accuracy of this determination is low. The different data is, for example, the vehicle position information acquired by the mobile terminal and the information transmitted from the store 67. For example, when the event determination unit 102 determines whether the event has been achieved by using the position information of the vehicle acquired by the mobile terminal, the determination accuracy of this determination is low. This modification can encourage the driver to execute an event with a higher determination accuracy.

The designation unit 318 may select an event that can be executed by the driver and display it on the display unit 36. That is, in this case, the driver cannot select the event that they want to execute from the plurality of events, and the driver executes only the event displayed on the display unit 36. In this case, the designation unit 318 may display the plurality of events on the display unit 36.

It is assumed that an event over the above predetermined period is designated as the special event. The predetermined period includes a first time that is an arbitrary time and a second time that is an arbitrary time after the first time. In this case, the magnitude of the change element when the special event is executed at the second time may be larger than that of the change element when the same special event is executed at the first time. In this case, the driver who sees the display unit 36 becomes more likely to have an intention to execute the special event as the remaining time of the predetermined period decreases. Thus, it becomes easy for the driver to execute a special event.

As a function, the driving diagnosis device 10 may include a group identification unit that acquires the driving diagnosis result from a plurality of the vehicles 30, and that identifies a target group including a plurality of drivers having similar driving operation characteristics based on the acquired plurality of driving diagnosis results. In this case, based on a large number of driving diagnosis results, the event determination unit 102 identifies a target event that is an event in which a driving diagnosis in which the target group received a lower driving diagnosis result than a predetermined level is executed. Further, when the event determination unit 102 determines that the target event has been executed by the driver belonging to the target group, the change element giving unit 103 generates and gives to the character 87, a change element larger than a change element of a case in which an event other than the target event is executed by the driver belonging to the target group. Thus, the possibility that the driver executes an event that they are not good at is increased, and it is possible to encourage the driver to perform a driving operation in which many driving diagnosis items are diagnosed.

The ECU 31 may include at least one function of the diagnosis unit 101, the event determination unit 102, the change element giving unit 103, and the group identification unit.

The driving diagnosis device 10 may have at least one function of the relevance determination unit 311, the setting unit 312A, the setting unit 312B, the lock determination unit 313, the level determination unit 314, the event identification unit 317, the designation unit 318, and the determination prohibition unit 319.

The detection unit may be any detection unit as long as it detects a physical quantity that changes based on at least one of traveling, steering, and braking of the vehicle 30 or a physical quantity that changes when a predetermined operating member is operated. For example, the detection unit may be a sensor for measuring the coolant temperature of an engine or may be a yaw rate sensor. Moreover, the number of detection units may be any number.

The driving diagnosis device 10 does not have to be connected to the Internet. In this case, for example, the detected value data acquired from the vehicle 30 is recorded on a portable recording medium (for example, a USB), and the detected value data in the recording medium is copied to the storage of the driving diagnosis device 10.

Instead of the GPS receiver 37, the vehicle 30 may include a receiver capable of receiving information from satellites of a global navigation satellite system (for example, Galileo) other than GPS.

What is claimed is:

1. A driving diagnosis device comprising:
   an event display unit that displays at least one event that is executed while a vehicle is driven;
   an event determination unit that determines whether the event is executed;
   a change element giving unit that gives, to a character of a game displayed on a display unit of an operation terminal by executing a game application, a change element that is generated in response to the event that is determined by the event determination unit to have been executed; and
   a determination prohibition unit that causes the event determination unit not to determine that the same event is executed, when the same event is executed after the number of times the same event is executed exceeds a limited number of times that is a predetermined plurality of times.

2. The driving diagnosis device according to claim 1, wherein when a predetermined time has elapsed since the same event is executed for the limited number of times or more, the determination prohibition unit allows the event determination unit to determine that the same event is executed when the same event is executed.

3. The driving diagnosis device according to claim 1, wherein when a predetermined billing process is performed after the same event is executed for the limited number of times or more, the determination prohibition unit allows the event determination unit to determine that the same event is executed when the same event is executed.

4. The driving diagnosis device according to claim 1,
   further comprising an event identification unit that identifies the event that is able to be executed by the vehicle, based on a detected value that is a physical quantity that changes based on at least one of traveling, steering, and braking of the vehicle or a physical quantity that changes when a predetermined operating member is operated, in which the detected value is detected by a detection unit provided in the vehicle,
   wherein the event display unit displays only the event identified by the event identification unit.

5. The driving diagnosis device according to claim 1,
   wherein the event determination unit is able to recognize a determination accuracy of whether the event is executed for each of the events, and
   wherein when the event determination unit determines that a second event that is a predetermined event having a higher determination accuracy than a first event that is a predetermined event is executed, the change element giving unit gives the character the change element that is larger than when the first event is executed.

6. A driving diagnosis method comprising:
   a step of displaying at least one event that is executed while a vehicle is driven; a step of determining whether the event is executed;
   a step of giving a change element that is generated in response to the event determined to have been executed to a character of a game that is displayed on a display unit of an operation terminal when a game application is executed; and
   a step of not determining that the same event is executed from being performed, when the same event is executed after the number of times the same event is executed exceeds a limited number of times that is a predetermined plurality of times.

* * * * *